United States Patent [19]

Wright et al.

[11] 3,731,939
[45] May 8, 1973

[54] WELLBORE INSTRUMENT SEALING APPARATUS

[75] Inventors: Leslie J. Wright, Collinsville; Reginald G. Ford, Tulsa, both of Okla.

[73] Assignee: Cities Service Oil Company, Tulsa, Okla.

[22] Filed: May 28, 1971

[21] Appl. No.: 148,064

[52] U.S. Cl. .....................277/34, 277/72 R, 285/97
[51] Int. Cl. .................................................F16j 15/10
[58] Field of Search......................277/34, 70, 71, 72; 285/97

[56] References Cited

UNITED STATES PATENTS

| 2,843,349 | 7/1958 | Meyer | 277/34 |
| 1,942,366 | 1/1934 | Seamark | 277/34 |
| 3,471,156 | 10/1969 | Burns et al. | 277/34 |
| 1,861,726 | 6/1932 | Trout | 277/34 |

Primary Examiner—George E. Lowrance
Assistant Examiner—Robert I. Smith
Attorney—J. Richard Geaman

[57] ABSTRACT

Disclosed herein is apparatus to be utilized in conjunction with a wellhead assembly consisting of a steel body accomodating a Hassler type sealing sleeve. The apparatus is utilized for sealing wellbore test instruments which are extended within a wellbore containing fluids under low pressures and is particularly applicable to the sealing of thermocouple lines which conventionally are most difficult to adequately seal, generally requiring large apparatus to form the seal.

3 Claims, 1 Drawing Figure

PATENTED MAY 8 1973
3,731,939
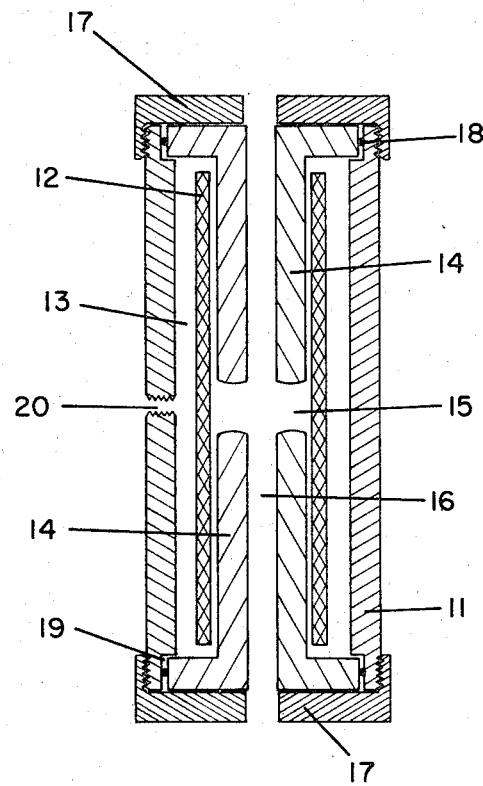
LESLIE J. WRIGHT,
REGINALD G. FORD,
INVENTORS.
BY *J Richard Geurman*
ATTORNEY.

WELLBORE INSTRUMENT SEALING APPARATUS

BACKGROUND OF THE INVENTION

The present invention relates to apparatus for sealing objects extended within wells. More particularly, the present invention is a low pressure wellhead sealing apparatus particularly useful in sealing wellhead assemblies through which thermocouple lines are strung, for example in the testing of wells for temperature profiles during an in situ combustion project.

During the introduction of testing equipment into wells, an inherent problem is incurred in that the testing equipment is difficult to pressure seal from fluid losses at the wellhead. In conventional sealing apparatus, fluids escape through the packing glands utilized as the sealing apparatus. This problem becomes particularly acute when the instrument itself is to be pulled from the well, especially in extremely deep wells having corrosive environments as the fluids more readily leak from the wall as the instrument passes through the conventional packing gland. In multiphase flowing wells, there exists an undeterminable amount of gas present in the well, this gas renders it nearly impossible to contain the pressure within the wellbore at a constant level as there is continual leakage of gas through the packing gland associated with the test equipment. Therefore, it is necessary, especially in deep wells, to use large, multistage packing glands to afford a sealing means for introducing and withdrawing the test equipment.

The sealing equipment utilized for wellbore instruments especially requires the use of a packing fluid, generally grease, which readily leaks about the test equipment and lines, and may cause leakage into or out of the well, associating tremendous problems with the operation. The bulk of the sealing equipment utilized makes it difficult to test pumping wells as often the pump must be skidded from the wellhead in order to afford the requisite space for the packing gland assembly to be mounted at the wellhead. Therefore, what is required is apparatus for wellbore test equipment, for example thermocouples, during the introduction of the test instruments into and from the well in order to adequately seal the well from fluid leakage.

It is an object of the present invention to provide apparatus for sealing wellbore test equipment introduced into a wellbore.

It is a further object of the present invention to provide a wellbore instrument sealing apparatus which may be utilized at low pressures.

It is still a further object of the present invention to provide a wellbore instrument sealing apparatus which does not require the removal of auxiliary equipment from a wellhead for the introduction of the test equipment into a flowing or stagnant well maintained under low pressures.

With these and other objects in mind, the present invention may be more fully understood through referral to the accompanying description and drawing.

SUMMARY OF THE INVENTION

The objects of the present invention are accomplished through use of a wellbore instrument sealing apparatus. The apparatus comprises a housing having a passageway therethrough sufficient in diameter to receive the wellbore instrument. Two rigid sleeves, comprising two sections with a gap therebetween in the center of the sleeves, are positioned within the passageway of the housing and affixed to the passageway at each end. The rigid sleeves have an inside diameter in excess of the outside diameter of the wellbore instrument to be passed therethrough. injection A flexible sleeve is positioned between the housing and rigid sleeves so as to be exposed to the passageway at the gap between the rigid sleeves. Means are provided for applying pressure to the exterior of the flexible sleeve so as to pass the flexible sleeve through the gap between the rigid sleeves and contact it with the wellbore instrument passed within the passageway. The means for applying pressure to the flexible sleeve may comprise the housing having a fluid injection port connecting the annulus formed between the exterior of the flexible sleeve and the interior of the housing to the exterior of the housing. Also provided may be means for injecting fluid under varying pressure into the injection port. In general, the means for injecting fluid under varying pressure into the injectin port comprise a pressure line, one end of which is connected to the fluid injection port at the exterior of the housing with a pressure pump connected to the opposite end of the pressure line.

BRIEF DESCRIPTION OF THE DRAWING

The present invention may be more fully understood by referral to the accompanying drawing in which one embodiment of the present invention is disclosed, having a flexible sleeve contained therebetween the housing and two rigid sleeves in conjunction with means for applying pressure to the flexible sleeve so as to pass it through the gap between the rigid sleeves and contact the wellbore instrument contained within the passageway.

DETAILED DESCRIPTION OF THE INVENTION

The present invention is most adequately described by referral to the accompanying FIGURE illustrating a well assembly consisting of a housing 11 having a first flexible sleeve 12 contained therein an annulus 13, formed therebetween the interior portion of the housing 11 and two rigid sleeves 14 firmly held within the housing 11. The rigid sleeves 14 have an inside diameter greater than the outside diameter of a wellbore instrument passed therethrough a passageway 16 formed within the rigid sleeves 14. The rigid sleeves 14 have a gap 15 therebetween, which exposes a portion of the flexible sleeve 12 to the passageway 16. The rigid sleeves 14 are firmly held in position within the housing 11 by means of threaded end caps 17, threadably connected to the ends of the housing 11. One or more O-rings 18 are positioned between the interior of the housing 11 and the rigid sleeves 14 to prevent fluid egress therefrom. The rigid sleeves 14 may be landed within recesses 19, reamed within the ends of housing 11 to further seal and position the O-rings 18 and rigid sleeves 14. The means for applying pressure upon the exterior of the flexible sleeve 12 are provided so that the flexible sleeve 12 may be contracted upon a wellbore instrument in order to give rigid support thereto and not allow fluid to bleed therethrough. Means for applying pressure to the exterior of the flexible sleeve 12 may comprise, for example the housing 11 having a fluid injection port 20 positioned between the exterior of the flexible sleeve 12 and the interior of the housing 11, and the exterior of the housing 11. Also provided are means for injecting fluid under varying pressure into the injection port 20. These means may comprise a pressure line, not depicted on the accompanying FIGURE, one end of which would be connected to the fluid injection port 20 at the exterior of the housing and a fluid pressure pump, also not depicted on the accompanying Figure, connected to the opposite end of the pressure line.

As depicted on the Figure, the Hassler sleeve which represents the flexible sleeve, is utilized for contraction against the cable and wellbore instrument in order to prevent leakage of fluid therefrom the wellbore. As depicted in the Figure, the flexible sleeve may be passed a considerable distance within the housing passageway by applying pressure to the flexible sleeve in accordance with the cable and instrument size to be utilized. Generally, the sleeve will be made of rubber to yield to the pressure applied thereto and the rigid sleeve will consist of steel as is the housing to yield rigidity and firmly hold the flexible sleeve in position. The particular advantage of utilizing the wellbore instrument sealing apparatus depicted in the Figure is that the apparatus allows a constant pressure to be placed upon the flexible tubing or sleeve which, in turn, fits the rigid sleeve contained within the housing to the cable and wellbore instrument so that fluid leakage through the passageway and from the wellhead is prevented.

A viscous fluid injection system may be utilized as a means for lubricating the cable as it is pulled through the flexible tubing or Hassler sleeve provided, but, if utilized, is not relied upon to form the sealing mechanism of the present invention as it is normally utilized in conventional operations. Through the operation of the apparatus of the present invention, one is afforded the flexibility of removing various size cables and wellbore instruments through the assembly. The pressure may be varied through the fluid injection ports, either by automatic control or pneumatically by manual control, so as to vary the pressure upon the flexible sleeve to adjust the sleeve to the various size cables and testing equipment to be introduced or withdrawn from the well. The apparatus utilized in this procedure provides a substantial low pressure barrier to prevent fluid leakage from the wellbore.

Therefore, the present invention affords a means for sealing cables and wellbore instruments at the surface through a simplified wellbore apparatus. The apparatus is comprised of replaceable parts which do not require a large amount of space for assembly and may be utilized in conjunction with conventional wellbore equipment without necessitating removal thereof. The apparatus may be comprised of conventional materials which will give long life and corrosion resistance, depending on the varied use and design. The apparatus then provides means for the introduction and withdrawal of wellbore instruments from a well while alleviating the normal problems of such operations.

While the invention has been described above with respect to certain embodiments thereof, it will be understood by those skilled in the art that various changes and modifications may be made without departing from the spirit and scope of the invention as set forth herein.

Therefore, I claim:

1. A wellbore instrument sealing apparatus comprising a housing having a passageway therethrough; at least one recess reamed within each interior end of said housing; two rigid sleeves firmly positioned within the passageway of said housing, each being affixed to one of said recesses of said housing at opposing ends and forming an annulus between the inside of said housing and said rigid sleeves, said sleeves having an inside diameter in excess of the outside diameter of the wellbore instrument to be passed therethrough and having a gap therebetween exposing the passageway to said housing; an end cap threadedly connected to each end of said housing abutting with said rigid sleeves so as to firmly hold said sleeves within said housing recesses; a flexible sleeve slideably positioned within said annulus between said housing and rigid sleeves; and a fluid injection port on the exterior surface of said housing and in communication with said annulus.

2. The wellbore sealing apparatus of claim 1, further comprising means for sealing the injected fluid within the annulus formed between the housing and flexible sleeve.

3. The wellbore sealing apparatus of claim 1 in which the means for sealing the injected fluid comprise one or more O rings positioned in the recesses between the rigid sleeves and the housing.

* * * * *